United States Patent
Iannuzzi et al.

(10) Patent No.: US 11,948,167 B2
(45) Date of Patent: *Apr. 2, 2024

(54) SYSTEM AND METHOD FOR LOYALTY POINT REDEMPTION FOR A NON-CONTRIBUTING MEMBER

(71) Applicant: The Toronto-Dominion Bank, Toronto (CA)

(72) Inventors: Davide Iannuzzi, North York (CA); Jeffrey MacDonald, Ottawa (CA); Neha Dipna Kalwani, Toronto (CA); Megan Spitali, Oakville (CA); Aileen Kheraj, North York (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/740,939

(22) Filed: May 10, 2022

(65) Prior Publication Data

US 2022/0292541 A1 Sep. 15, 2022

Related U.S. Application Data

(63) Continuation of application No. 17/190,790, filed on Mar. 3, 2021, now Pat. No. 11,354,698.

(51) Int. Cl.
*G06Q 30/00* (2023.01)
*G06Q 10/02* (2012.01)
(Continued)

(52) U.S. Cl.
CPC ......... *G06Q 30/0233* (2013.01); *G06Q 10/02* (2013.01); *G06Q 30/0239* (2013.01)

(58) Field of Classification Search
None
See application file for complete search history.

(56) References Cited

U.S. PATENT DOCUMENTS 8,073,736 B2 12/2011 Blagg et al.
8,606,631 B2 12/2013 Blagg
(Continued)

FOREIGN PATENT DOCUMENTS

WO 20170154014 A1 9/2017

OTHER PUBLICATIONS

Automatically install apps and extensions, Dec. 6, 2019, Google Corporation, printed through www.archive.org (Year: 2019).*

(Continued)

*Primary Examiner* — Naresh Vig
(74) *Attorney, Agent, or Firm* — Rowand LLP

(57) ABSTRACT

A server computer system comprises a communications module; a processor coupled with the communications module; and a memory coupled to the processor and storing processor-executable instructions which, when executed by the processor, configure the processor to receive, via the communications module and from a computing device associated with a contributing member, a signal defining one or more interface elements to be displayed on a computing device associated with a non-contributing member and one or more interface elements to be withheld from being displayed on the computing device associated with the non-contributing member; complete a booking request by applying loyalty points from a loyalty point account associated with a group of contributing members to offset a cost of the booking request for the non-contributing member; and responsive to completing the booking request, send, via the communications module and to the computing device associated with the non-contributing member, a signal indicating that the group of contributing members have contributed loyalty points to offset the cost of the booking request for the non-contributing member and including a selectable option that, when selected, causes the computing device associated (Continued)

with the non-contributing member to display a user interface that includes the one or more interface elements to be displayed and does not include the one or more interface elements to be withheld from being displayed.

16 Claims, 11 Drawing Sheets

(51) Int. Cl.
*G06Q 30/0207* (2023.01)
*G06Q 30/0226* (2023.01)

(56) References Cited

U.S. PATENT DOCUMENTS

| | | |
|---|---|---|
| 2002/0128916 A1 | 9/2002 | Beinecke, III |
| 2003/0212620 A1 | 11/2003 | Blagg |
| 2007/0106556 A1 | 5/2007 | Edwards et al. |
| 2007/0179840 A1 | 8/2007 | Kroner et al. |
| 2010/0114688 A1 | 5/2010 | Song et al. |
| 2013/0124294 A1 | 5/2013 | Peak et al. |
| 2013/0166445 A1* | 6/2013 | Isaacson ............... G06Q 20/10 705/41 |
| 2014/0006132 A1 | 1/2014 | Barker |
| 2014/0250001 A1 | 9/2014 | Isaacson et al. |
| 2014/0304056 A1* | 10/2014 | Postrel ............... G06Q 30/0601 705/14.27 |
| 2015/0161614 A1 | 6/2015 | Tsing |
| 2016/0071141 A1 | 3/2016 | Neemann et al. |
| 2018/0322543 A1 | 11/2018 | Graybill |
| 2021/0174338 A1* | 6/2021 | Isaacson ............... G06Q 40/02 |
| 2021/0217042 A1* | 7/2021 | Bodo ............... G06Q 30/0279 |

OTHER PUBLICATIONS

Jason Steele, Using points and miles to book award travel for others, Apr. 24, 2015, ThePointsGuy.com (Year: 2015).*

Alex Breen, Can I use my southwest points to buy a ticket for someone else?, Oct. 20, 2020, WalletHub.com (Year: 2020).*

RAFTER: "Sharing hotel points? These loyalty programs allow it", published in: CreditCards.com, https://www.creditcards.com/credit-card-news/hotel-programs-sharing-pooling-points/, published on Jul. 23, 2018.

JETBLUE: "Points Pooling", retrieved from https://www.jetblue.com/trueblue/points-pooling, on Dec. 21, 2020.

Information on GoFundMe, 2018. GoFundMe.com, archived web pages printed through www.archive.org, date is in the URL in YYYYMMDD (Year: 2018). 2018.

The Weekly Flyer published article "British Airways Family Account—How to establish and use one", BoardingArea. com (Year: 2012) Apr. 23, 2012.

Informal care and gifts to and from older people in Europe. The interlinks between giving and receiving, Oct. 21, 2016, BMC Health Services Research (Year: 2016) Oct. 21, 2016.

CIPO: Office Action related to Canadian Application No. 3,111,130 dated Jul. 25, 2023.

* cited by examiner

SYSTEM AND METHOD FOR LOYALTY POINT REDEMPTION FOR A NON-CONTRIBUTING MEMBER

CROSS-REFERENCE TO RELATED APPLICATIONS

This application is a continuation of U.S. patent application Ser. No. 17/190,790 entitled "SYSTEM AND METHOD FOR LOYALTY POINT REDEMPTION FOR A NON-CONTRIBUTING MEMBER", filed on Mar. 3, 2021, the contents of which are incorporated herein by reference in their entirety.

TECHNICAL FIELD

The present application relates to systems and methods for loyalty point redemption for a non-contributing member.

BACKGROUND

Loyalty points may be used to reduce or offset a purchase price. For example, a user may apply loyalty points to complete a booking request.

It may be difficult to complete a booking request for a group as one or more group members may not have loyalty points or may have loyalty points associated with a different loyalty point program.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
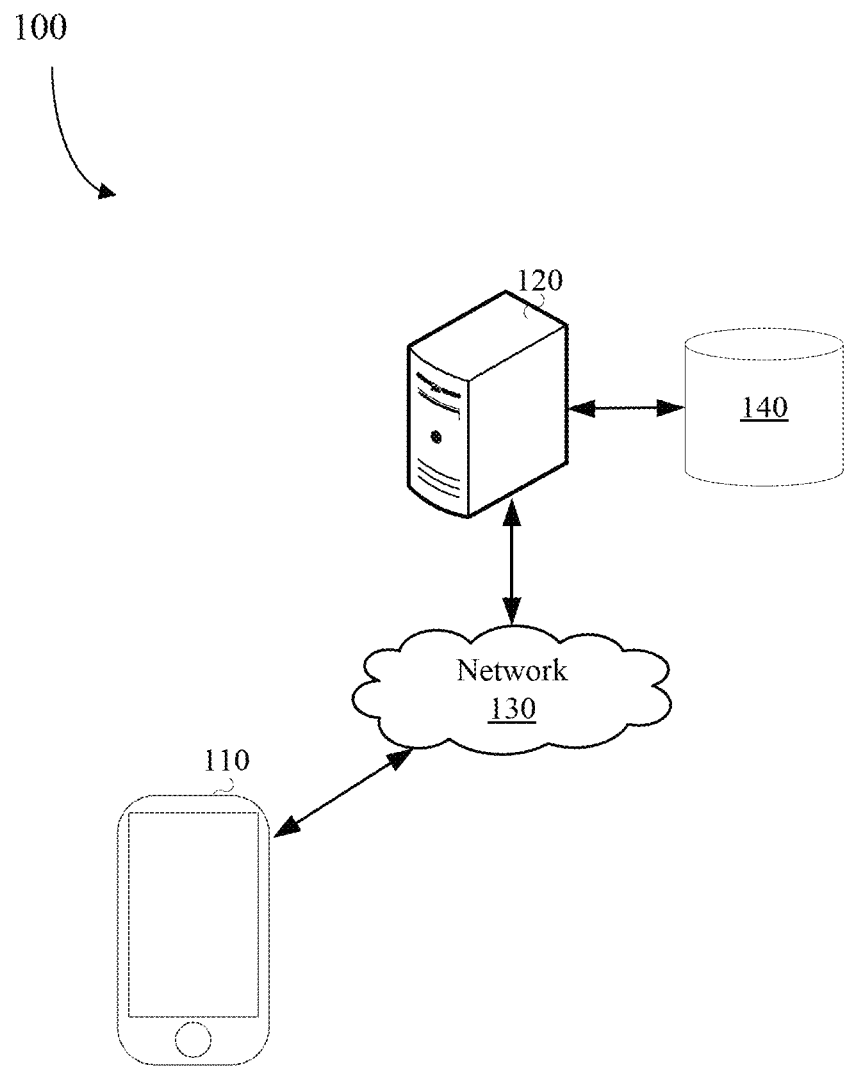
FIG. 1 is a schematic operation diagram illustrating an operating environment of an example embodiment.

Accordingly, in one aspect there is provided a server computer system comprising a communications module; a processor coupled with the communications module; and a memory coupled to the processor and storing processor-executable instructions which, when executed by the processor, configure the processor to receive, via the communications module and from at least one computing device associated with at least one contributing member, a signal including a request to transfer an amount of loyalty points from a loyalty point account of the at least one contributing member to a loyalty point account associated with a group; transfer the amount of loyalty points from a data record associated with the loyalty point account of the at least one contributing member to a data record associated with the loyalty point account associated with the group; receive, via the communications module and from the at least one computing device associated with the at least one contributing member, a signal including a booking request for one or more non-contributing members; and apply loyalty points from the loyalty point account associated with the group to offset a cost of the booking request for the one or more non-contributing members and complete the booking request.

In one or more embodiments, the processor-executable instructions, when executed by the processor, further configure the processor to responsive to receiving the signal including the booking request for the one or more non-contributing members, send, via the communications module and to at least one other computing device associated with at least one other contributing member, a signal including a request to accept the booking request; receive, via the communications module and from the at least one other computing device associated with the at least one other contributing member, a signal indicating that the booking request has been accepted; and responsive to receiving the signal indicating that the booking request has been accepted, apply the loyalty points from the loyalty point account associated with the group to offset the cost of the booking request for the one or more non-contributing members.

In one or more embodiments, the processor-executable instructions, when executed by the processor, further configure the processor to receive, via the communications module and from the computing device associated with the contributing member, a signal including a proposed booking request; send, via the communications module and to computing devices of all other contributing members, a signal including a request to accept or reject the proposed booking request; receive, via the communications module and from each computing device associated with each contributing member, a signal indicating that the proposed booking request has been accepted or rejected; determine a count of signals indicating that the proposed booking request has been accepted and a count of signals indicating that the proposed booking request has been rejected; determine that the count of signals indicating that the proposed booking request has been rejected is greater than the count of signals indicating that the proposed booking request has been accepted; and responsive to determining that the count of signals indicating that the proposed booking request has been rejected is greater than the count of signals indicating that the proposed booking request has been accepted, reject the proposed booking request and send, via the communications module and to the at least one computing device associated with the contributing member, a signal including a notification that the proposed booking request has been rejected.

In one or more embodiments, the at least one contributing member has booking permissions and at least one other contributing member does not have booking permissions, the signal including the booking request for the one or more non-contributing members received from the computing device associated with the at least one contributing member having booking permissions.

In one or more embodiments, the processor-executable instructions, when executed by the processor, further configure the processor to receive, via the communications module and from at least one computing device associated with a non-contributing member, a signal including authentication information; determine that the authentication information is associated with the non-contributing member; and responsive to determining that the authentication information is associated with the non-contributing member, send, via the communications module and to the at least one computing device associated with the non-contributing member, a signal causing the at least one computing device associated with the non-contributing member to display a user interface displaying limited information associated with the booking request.

In one or more embodiments, the processor-executable instructions, when executed by the processor, further configure the processor to determine an amount of loyalty points required to offset the cost of the booking request for the one or more non-contributing members; determine that the amount of loyalty points required to offset the cost of the booking request for the one or more non-contributing members is greater than an amount of loyalty points stored in the loyalty point account associated with the group; and send, via the communications module and to the at least one computing device, a signal causing the at least one computing device to display a message indicating that the amount of loyalty points required to offset the cost of the booking for the one or more non-contributing members is greater than the amount of loyalty points stored in the loyalty point account associated with the group.

In one or more embodiments, the signal causing the at least one computing device to display the message indicating that the amount of loyalty points required to offset the cost of the booking request for the one or more non-contributing members is greater than the amount of loyalty points stored in the loyalty point account associated with the group includes a selectable option to transfer an additional amount of loyalty points from the loyalty point account associated with the contributing member to the loyalty point account associated with the group.

In one or more embodiments, the processor-executable instructions, when executed by the processor, further configure the processor to responsive to applying the loyalty points from the loyalty point account associated with the group to offset the cost of the booking request for one or more non-contributing members, send, via the communications module and to a computing device associated with the non-contributing member, a signal indicating that the contributing members have contributed loyalty points to offset the cost of the booking request.

In one or more embodiments, the processor-executable instructions, when executed by the processor, further configure the processor to provide, via the communications module and to the at least one computing device, a signal causing the at least one computing device to display a user interface including a module configured to allow contributing members of the group to exchange messages.

In one or more embodiments, the processor-executable instructions, when executed by the processor, further configure the processor to engage at least one application programming interface associated with a booking service, the user interface including a booking module associated with the booking service.

According to another aspect, there is provided a computer-implemented method comprising receiving, via a communications module and from at least one computing device associated with at least one contributing member, a signal including a request to transfer an amount of loyalty points from a loyalty point account of the at least one contributing member to a loyalty point account associated with a group; transferring the amount of loyalty points from a data record associated with the loyalty point account of the at least one contributing member to a data record associated with the loyalty point account associated with the group; receiving, via the communications module and from the at least one computing device associated with the at least one contributing member, a signal including a booking request for one or more non-contributing members; and applying loyalty points from the loyalty point account associated with the group to offset a cost of the booking request for the one or more non-contributing members and complete the booking request.

In one or more embodiments, the method further comprises responsive to receiving the signal including the booking request for the one or more non-contributing members, sending, via the communications module and to at least one other computing device associated with at least one other contributing member, a signal including a request to accept the booking request; receiving, via the communications module and from the at least one other computing device associated with the at least one other contributing member, a signal indicating that the booking request has been accepted; and responsive to receiving the signal indicating that the booking request has been accepted, applying the loyalty points from the loyalty point account associated with the group to offset the cost of the booking request for the one or more non-contributing members.

In one or more embodiments, the method further comprises receiving, via the communications module and from the computing device associated with the contributing member, a signal including a proposed booking request; sending, via the communications module and to computing devices of all other contributing members, a signal including a request to accept or reject the proposed booking request; receiving, via the communications module and from each computing device associated with each contributing member, a signal indicating that the proposed booking request has been accepted or rejected; determining a count of signals indicating that the proposed booking request has been accepted and a count of signals indicating that the proposed booking request has been rejected; determining that the count of signals indicating that the proposed booking request has been rejected is greater than the count of signals indicating that the proposed booking request has been accepted; and responsive to determining that the count of signals indicating that the proposed booking request has been rejected is greater than the count of signals indicating that the proposed booking request has been accepted, rejecting the proposed booking request and sending, via the communications module and to the at least one computing device associated with the contributing member, a signal including a notification that the proposed booking request has been rejected.

In one or more embodiments, the at least one contributing member has booking permissions and at least one other contributing member does not have booking permissions, the signal including the booking request for the one or more non-contributing members received from the computing device associated with the at least one contributing member having booking permissions.

In one or more embodiments, the method further comprises receiving, via the communications module and from at least one computing device associated with a non-contributing member, a signal including authentication information; determining that the authentication information is associated with the non-contributing member; and responsive to determining that the authentication information is associated with the non-contributing member, sending, via the communications module and to the at least one computing device associated with the non-contributing member, a signal causing the at least one computing device associated with the non-contributing member to display a user interface displaying limited information associated with the booking request.

In one or more embodiments, the method further comprises determining an amount of loyalty points required to offset the cost of the booking request for the one or more non-contributing members; determining that the amount of loyalty points required to offset the cost of the booking request for the one or more non-contributing members is greater than an amount of loyalty points stored in the loyalty point account associated with the group; and sending, via the communications module and to the at least one computing device, a signal causing the at least one computing device to display a message indicating that the amount of loyalty points required to offset the cost of the booking for the one or more non-contributing members is greater than the amount of loyalty points stored in the loyalty point account associated with the group.

In one or more embodiments, the signal causing the at least one computing device to display the message indicating that the amount of loyalty points required to offset the cost of the booking request for the one or more non-contributing members is greater than the amount of loyalty points stored in the loyalty point account associated with the group includes a selectable option to transfer an additional amount of loyalty points from the loyalty point account associated with the contributing member to the loyalty point account associated with the group.

In one or more embodiments, the method further comprises responsive to applying the loyalty points from the loyalty point account associated with the group to offset the cost of the booking request for one or more non-contributing members, sending, via the communications module and to a computing device associated with the non-contributing member, a signal indicating that the contributing members have contributed loyalty points to offset the cost of the booking request.

In one or more embodiments, the method further comprises engaging at least one application programming interface associated with a booking service; and providing, via the communications module and to the at least one computing device, a signal causing the at least one computing device to display a user interface including a module configured to allow contributing members of the group to exchange messages and a booking module associated with the booking service.

According to another aspect there is provided a non-transitory computer readable storage medium comprising computer-executable instructions which, when executed, configure a processor to receive, via a communications module and from at least one computing device associated with at least one contributing member, a signal including a request to transfer an amount of loyalty points from a loyalty point account of the at least one contributing member to a loyalty point account associated with a group; transfer the amount of loyalty points from a data record associated with the loyalty point account of the at least one contributing member to a data record associated with the loyalty point account associated with the group; receive, via the communications module and from the at least one computing device associated with the at least one contributing member, a signal including a booking request for one or more non-contributing members; and apply loyalty points from the loyalty point account associated with the group to offset a cost of the booking request for the one or more non-contributing members and complete the booking request.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment. As shown, the system 100 includes a computing device 110 and a server computer system 120 coupled to one another through a network 130, which may include a public network such as the Internet and/or a private network. The computing device 110 and the server computer system 120 may be in geographically disparate locations. Put differently, the computing device 110 and the server computer system 120 may be located remote from one another.

The server computer system 120 may be associated with a financial institution, a value card provider such as for example a credit card provider, and/or a loyalty points provider.

The server computer system 120 is a computer server system. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, compute servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The computing device 110 is a computer system. The computing device 110 may be, for example, a smartphone as shown. The computing device 110 may, however, be a computing device of another type such as for example a personal computer, a laptop computer, a tablet computer, a notebook computer, a hand-held computer, a personal digital assistant, a portable navigation device, a mobile phone, a smart phone, a wearable computing device (e.g. a smart watch, a wearable activity monitor, wearable smart jewelry, a glasses and other optical devices that include optical head-mounted displays), and any other type of computing device that may be configured to store data and software instructions, and execute software instructions to perform operations consistent with disclosed embodiments. In certain embodiments, the computing device 110 may be adapted to present a graphical user interface that allows for communication with the server computer system 120.

Although only a single computing device is shown in FIG. 1, it will be appreciated that multiple computing devices may be connected to the network 130, wherein each computing device may be adapted to present a graphical user interface that allows for communication with the server computer system 120. For example, the graphical user interface may include a module configured to allow users to exchange messages.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, a telecommunications network, or the like.

The server computer system 120 may be associated with or may communicate with a database 140 that stores account data. For example, the account data may be user or customer accounts and may include value account data and loyalty point data. The value account data may include one or more value accounts such as for example a bank account or a credit card account associated with the user. The loyalty point data may include a loyalty points balance available to the user. The loyalty point data may be related to the value account data. For example, the loyalty point data may be based on or related to transactions made by the user on a particular credit card. The account data may additionally include any one or more of a personal name, geographic address, a telephone number, a date of birth, etc. The server computer system 120 may communicate with the database 140 directly or through the network 130. It will be appreciated that although the database 140 is shown as being associated with the server computer system 120, in another embodiment the database 140 may be separate from the server computer system 120 and may be associated with, for example, a third-party server. Further, the server computer system 120 may be associated with multiple databases.

The server computer system 120 may be configured to engage one or more application programming interfaces (APIs) to access one more third party servers. For example, the server computer system 120 may engage an API associated with a booking service and as such may communicate with a server associated with the booking service.

Figure 2:
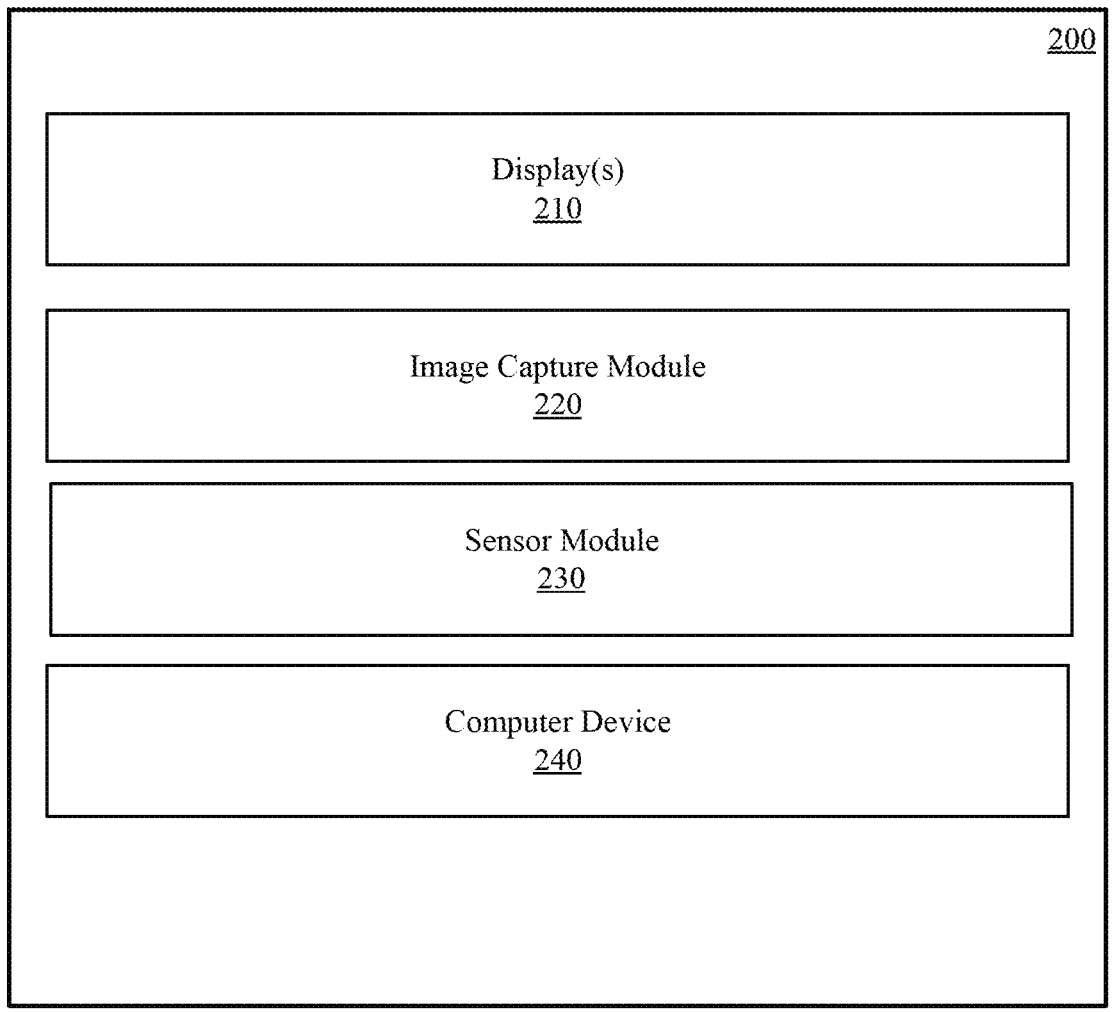
FIG. 2 is a simplified schematic diagram showing components of a computing device.

FIG. 2 is a simplified schematic diagram showing component of an exemplary computing device 200. The computing device 110 may be of the same type as computing device 200. The computing device 200 may include modules including, as illustrated, for example, one or more displays 210, an image capture module 220, a sensor module 230, and a computer device 240.

The one or more displays 210 are a display module. The one or more displays 210 are used to display screens of a graphical user interface that may be used, for example, to communicate with the server computer system 120 (FIG. 1). The one or more displays 210 may be internal displays of the computing device 200 (e.g., disposed within a body of the computing device).

The image capture module 220 may be or may include a camera. The image capture module 220 may be used to obtain image data, such as images. The image capture module 220 may be or may include a digital image sensor system as, for example, a charge coupled device (CCD) or a complementary metal-oxide-semiconductor (CMOS) image sensor.

The sensor module 230 may be a sensor that generates sensor data based on a sensed condition. By way of example, the sensor module 230 may be or include a location subsystem which generates location data indicating a location of the computing device 200. The location may be the current geographic location of the computing device 200. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computer device 240 is in communication with the one or more displays 210, the image capture module 220, and the sensor module 230. The computer device 240 may be or may include a processor which is coupled to the one or more displays 210, the image capture module 220, and/or the sensor module 230.

Figure 3:
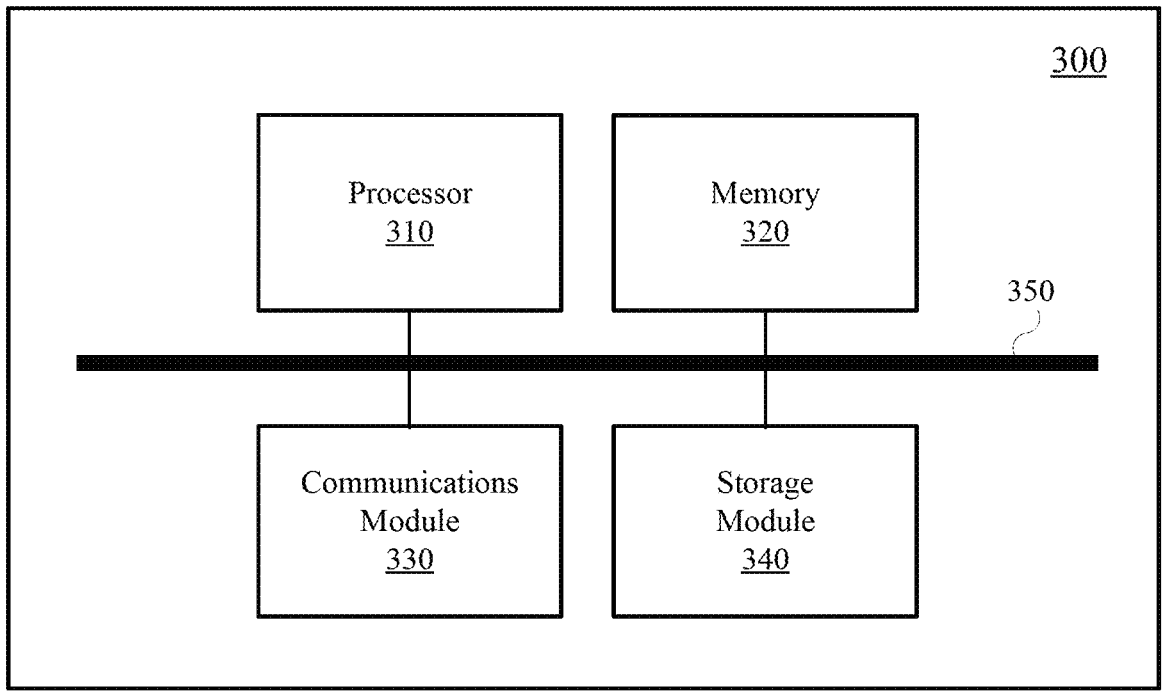
FIG. 3 is a high-level schematic diagram of an example computer device.

Referring now to FIG. 3, a high-level operation diagram of an example computer device 300 is shown. In some embodiments, the computer device 300 may be exemplary of the computer device 240 (FIG. 2) and/or the server computer system 120.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persisted storage of the memory 320. Additionally or alternatively, instructions may be executed by the processor 310 directly from read-only memory of the memory 320.

Figure 4:
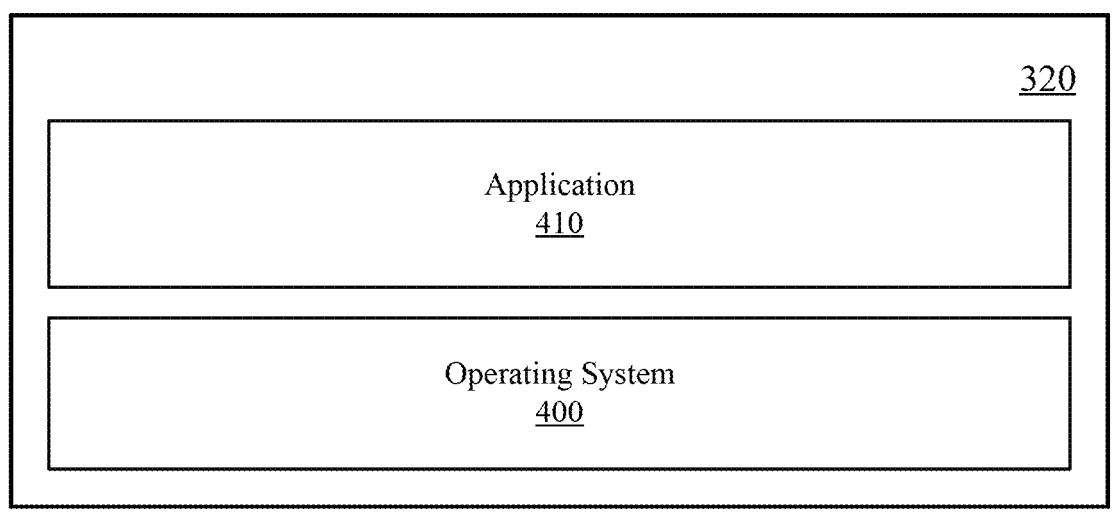
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computer device 240 (FIG. 2) and/or the server computer system 120.

While a single application 410 is illustrated in FIG. 3, in operation the memory 320 may include more than one application 410 and different applications 410 may perform different operations. For example, in at least some embodiments in which the computer device 300 is functioning as the computing device 110, the applications 410 may include a banking application. The banking application may be configured for secure communications with the server computer system 120 and may provide various banking functions such as, for example, the ability to display a quantum of value in one or more data records (e.g. display balances), configure or request that operations such as transfers of value (e.g. bill payments, email money transfers and other transfers) be performed, and other account management functions.

By way of further example, in at least some embodiments in which the computer device 300 functions as the computing device 110, the applications 410 may include a web browser, which may also be referred to as an Internet browser. In at least some such embodiments, the server computer system 120 may be a web server. The web server may cooperate with the web browser and may serve as an interface when the interface is requested through the web browser. For example, the web browser may serve as a mobile banking interface. The mobile banking interface may provide various banking functions such as, for example, the ability to display a quantum of value in one or more data records (e.g. display balances), configure or request that operations such as transfers of value (e.g. bill payments and other transfers) be performed, and other account management functions.

By way of further example, in at least some embodiments in which the computer device 300 functions as the computing device 110, the applications 410 may include an electronic messaging application. The electronic messaging application may be configured to display a received electronic message such as an email message, short messaging service (SMS) message, or a message of another type. In at least some embodiments, the server computer system 120 may be configured, through computer-executable instructions, to send an electronic message to the computing device 110. For example, the server computer system 120 may be configured to send a SMS message to a phone number associated with a user and an electronic messaging application on the computing device 110 may be configured to retrieve the message and display the message to the user. As another example, the server computer system 120 may be configured to send an email message to an email address associated with a user and an email application on the computing device 110 may be configured to retrieve the message and display the message to the user.

As yet another example, in at least some embodiments in which the computer device 300 functions as the computing device 110, the applications 410 may include a loyalty points application. The loyalty points application may be configured for secure communications with the server computer system 120 and may provide various functions such as, for example, the ability to display a quantum of value in one or more data records (e.g. display a loyalty points balance), the ability to create or participate in a group, the ability to configure or request that operations such as contributing loyalty points to a loyalty point account associated with a group or applying loyalty points from the loyalty point account associated with the group to offset a booking request, and other loyalty point functions.

The server computer system 120 obtains loyalty point data from database 140 and provides the loyalty point data to the user through a graphical user interface of the loyalty points application. The loyalty point data may include, for example, a loyalty point balance of a loyalty point account of the user. As will be described in more detail below, the loyalty point data may identify one or more loyalty point groups associated with the loyalty point account of the user.

The loyalty points application may require the user to authenticate to access their account data stored on the database 140. For example, the graphical user interface may display a request to authenticate and the user may complete the request by entering authentication information such as for example a username and a password. It will be appreciated that other authentication methods may be used and may require the user to provide, for example, biometric data such as for example a fingerprint via an input device associated with the computing device 110.

During authentication, the server computer system 120 receives a signal from the computing device 110 that includes authentication information submitted by the user. The server computer system 120 compares the received authentication information to previously obtained authentication information stored in the database 140 and when it is determined that the received authentication information matches the authentication information stored in the database, the user is authenticated. For example, the server computer system 120 may compare the received username and password to a previously obtained username and password to authenticate the user.

Responsive to successful authentication, the server computer system 120 obtains loyalty point data associated with the loyalty point account of the user. In this embodiment, the server computer system 120 may obtain the loyalty point data by performing a lookup in the database 140 using the username received during authentication.

The server computer system 120 sends, to the computing device 110, a signal including the loyalty point data. The user may view the loyalty point data through the graphical user interface associated with the loyalty points application.

The graphical user interface of the loyalty points application may include selectable options that, when selected, may cause the server computer system 120 to perform one or more functions. For example, the graphical user interface of the loyalty points application may include a selectable option that, when selected, may cause the server computer system 120 to perform operations to create a loyalty point account associated with a group.

Figure 5:
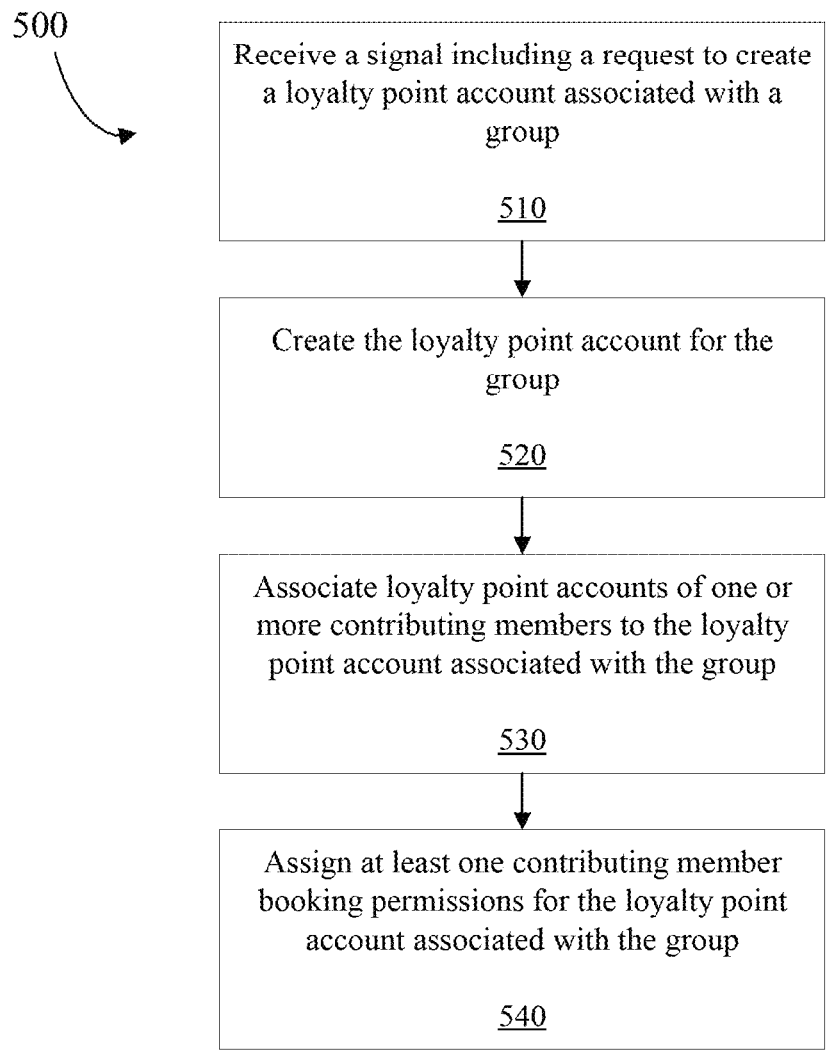
FIG. 5 is a flowchart showing operations performed by a server in creating a loyalty point account associated with a group according to an embodiment.

FIG. 5 is a flowchart showing operations performed by the server computer system 120 in creating a loyalty point account associated with a group according to an embodiment. The operations may be included in a method 500 which may be performed by the server computer system 120. For example, computer-executable instructions stored in memory of the server computer system 120 may, when executed by one or more processors, configure the server computer system 120 to perform the method 500 or a portion thereof.

The server computer system 120 receives, via the communications module and from the computing device 110, a signal including a request to create a loyalty point account associated with a group (step 510).

In this embodiment, responsive to the user selecting the selectable option for creating a loyalty point account associated with a group, the computing device 110 sends a signal including the request to create the loyalty point account associated with a group.

The request to create the loyalty point account associated with a group may include information identifying one or more members of the group. For example, responsive to the user selecting the selectable option to create the loyalty point account associated with the group, the computing device 110 may display a graphical user interface including one or more input fields to enter information of the other members of the group. For example, the input fields may include input fields to enter email addresses of the other members of the group.

The input fields may additionally include an input field to designate permissions granted to each member. For example, the input fields may include an input field to designate whether or not the member has booking permissions for the loyalty point account associated with the group. Put another way, some members of the group may have booking permissions and some other members of the group may not have booking permissions.

The input fields may additionally include an input field to designate which members are contributing members and which members are non-contributing members. A contributing member is a member that is required to contribute or transfer loyalty points into the loyalty point account associated with the group. A non-contributing member is a member that is not required to contribute or transfer loyalty points into the loyalty point account associated with the group. As will be described in more detail below, the contributing members may have access to information not accessible by the non-contributing members. For example, contributing members may have access to information regarding the cost or amount of loyalty points required to complete a booking request or the cost or amount of loyalty points used to complete the booking request. Non-contributing members may not have access to this information. For example, when a non-contributing member accesses the group within the loyalty point application, the non-contributing member will not see loyalty point information.

As will be described in more detail below, the server computer system 120 may determine if a member is a contributing member or a non-contributing member during authentication. In some embodiments, the non-contributing members may be added at a later date, that is, after the group has already been created. For example, the contributing members may decide when to add the one or more non-contributing members and this may be done within the loyalty point application. In another example, the non-contributing members may be provided access to the group within the loyalty point application responsive to the completion of the booking request and this may be done automatically by the server computer system 120. In this example, information relating to the one or more non-contributing members received during step 510 may be stored in the database 140 until a booking request has been completed. Responsive to the server computer system 120 completing the booking request, the server computer system 120 may retrieve the information relating to the one or more non-contributing members and may send, for example, an email message to the one or more non-contributing members. The email message may include a selectable option that, when selected, directs a computing device of the one or more non-contributing members to the group within the loyalty point application.

The user who initiated the request is set as a contributing member by default. That is, the user who created the group is set as a contributing member.

The server computer system 120 creates the loyalty point account associated with the group (step 520).

In this embodiment, the server computer system 120 creates one or more data records in the database 140 for the loyalty point account associated with the group. The data records are configured to store loyalty point data. The loyalty point data includes a loyalty point balance for the loyalty point account associated with the group. The loyalty point data may also include the information identifying one or more members of the group. For example, the loyalty point data may include a list of all contributing and non-contributing members of the group. The list may include information such as an email address of each member of the group.

Responsive to creating the loyalty point account associated with the group, the server computer system 120 may generate and send an email message to the one or more contributing members and/or the one or more non-contributing members. The email may include information related to the group and may include a selectable option that, when selected, causes the computing device to open the loyalty point application. In embodiments where the computing device does not have the loyalty point application, the email may include a selectable option that, when selected, downloads the loyalty point application. Once downloaded, the user may be prompted to authenticate and if the user does not have an account, the user may select a selectable option to create an account.

In some embodiments, responsive to opening the loyalty point application, the user may be prompted to authenticate in manners similar to that described herein. In other embodiments, the user may not be required to authenticate. For example, the user may unlock the computing device using facial recognition and, once unlocked, the loyalty point application may be opened without requiring further authentication.

Once the loyalty point application has been opened (directly or after successful authentication), the computing device may be caused to display a notification indicating to the user that they have been invited to a group. The notification may include a selectable option that, when selected, accepts the invitation and causes the server computer system 120 to add the user to the group. It will be appreciated that the user is added to the group as defined by the permissions set by the user who initiated the request during step 510. For example, where a user was designated as a contributing member, the user is added to the group as one of the contributing members in response to the user accepting the invitation.

The server computer system 120 associates the loyalty point account for one or more contributing members to the loyalty point account associated with the group (step 530).

In this embodiment, the server computer system 120 may identify a loyalty point account for one or more contributing members. For example, the loyalty point account of the user who initiated the request during step 510 is identified. Other loyalty point accounts of the one or more contributing members may be identified using, for example, the email address of each member of the group. As another example, the other loyalty point accounts of the one or more members may be identified responsive to the one or more other members authenticating and accepting the invitation to join the group.

Once an account has been identified for a contributing member, the account is associated with the loyalty point associated with the group. As such, the contributing member may access loyalty point data of the group within the loyalty point application. It will be appreciated that the contributing member may still access loyalty point data associated with their loyalty point account within the loyalty point application.

The server computer system 120 assigns at least one contributing member booking permissions for the loyalty point account associated with the group (step 540). A contributing member who has booking permission is permitted to apply or otherwise spend loyalty points stored in the loyalty point account associated with the group. In at least some embodiments, a contributing member who has booking permission may require approval from another contributing member who has booking permission to apply or otherwise spend the loyalty points stored in the loyalty point account associated with the group. In at least some embodiments, a contributing member who has booking permission may require approval from the majority of contributing members to apply or otherwise spend the loyalty points stored in the loyalty point account associated with the group. For example, the contributing members may vote on a proposed request to apply or otherwise spend the loyalty points stored in the loyalty point account associated with the group.

Contributing members who do not have booking permissions are not permitted to apply or otherwise spend loyalty points stored in the loyalty point account associated with the group.

In this embodiment, the user who initiated the request is assigned as the contributing member that has booking permissions for the loyalty point account associated with the group. Other contributing members may be assigned to have booking permissions and this may be done during step 510 by the user who initiated the request. Other contributing members may be assigned booking permissions within the loyalty point application and this may be done by any other contributing member that also has booking permissions.

The server computer system 120 may provide a group hub graphical user interface that may be accessed by the contributing members within the loyalty point application. For example, once a contributing member has accepted the invitation to the group, the server computer system 120 may provide, via the communications module and to the computing device of a contributing member, a signal causing the computing device to display a graphical user interface in the form of a group hub graphical user interface. The group hub graphical user interface may include a chat module configured to allow contributing members of the group to exchange messages.

In one or more embodiments, the server computer system 120 may engage an application programming interface (API) associated with a booking service and the graphical user interface may include a booking module associated with the booking service. The booking service may include, for example, one or more of a flight booking service, a hotel booking service, a restaurant reservation service, a ticket booking service, etc. As such, within the loyalty point application, the contributing members may search for flights, hotels, restaurants, tickets, etc. and may discuss their findings within the chat module. The contributing members may additionally provide recommendations within the chat module. In this manner, as will be described in more detail below, the contributing member(s) that have booking permissions may generate a booking request within the loyalty point application and may apply loyalty points from the loyalty point account associated with the group to offset the cost of the booking request for one or more non-contributing members.

The loyalty point application may further be configured to generate an itinerary outlining any completed booking requests and other suggestions from the contributing members. For example, the loyalty point application may engage a calendar API and may populate days or dates associated with any completed booking requests. Within the group hub graphical user interface, a selectable option may be provided that, when selected, displays the itinerary.

Figure 6:
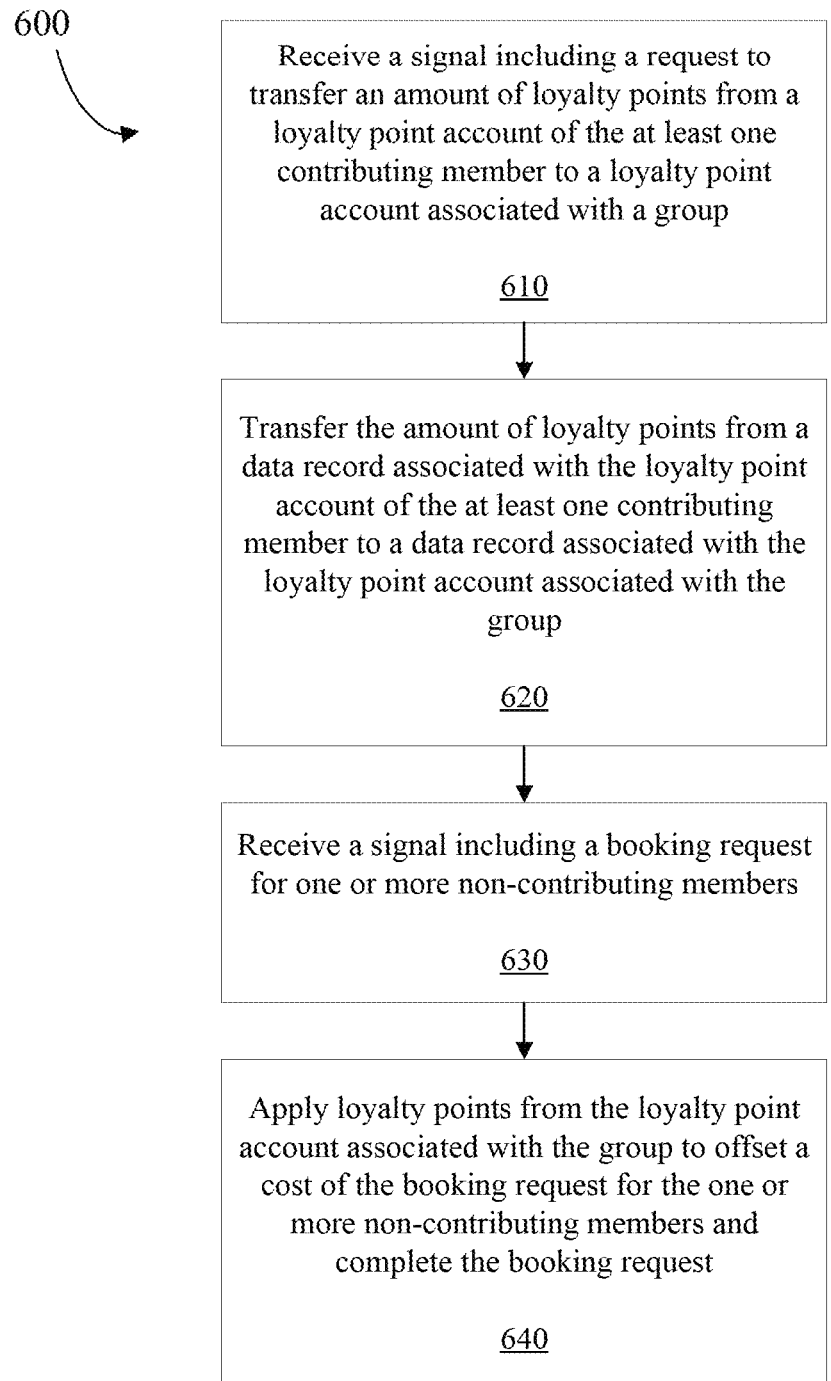
FIG. 6 is a flowchart showing operations performed by a server in loyalty point redemption for a non-contributing member according to an embodiment.

The contributing members may contribute loyalty points to offset the cost of a booking request for one or more non-contributing members. FIG. 6 is a flowchart showing operations performed by the server computer system 120 in redeeming loyalty points for one or more non-contributing members according to an embodiment. The operations may be included in a method 600 which may be performed by the server computer system 120. For example, computer-executable instructions stored in memory of the server computer system 120 may, when executed by one or more processors, configure the server computer system 120 to perform the method 600 or a portion thereof.

The server computer system 120 receives, via the communications module and from at least one computing device associated with at least one contributing member, a signal including a request to transfer an amount of loyalty points from a loyalty point account of the at least one contributing member to a loyalty point account associated with a group (step 610).

In this embodiment, within the loyalty point application, the contributing member may select a selectable option to transfer an amount of loyalty points from their loyalty point account to the loyalty point account associated with the group. The selectable option may include an input field to define the amount of loyalty points to be transferred. It will be appreciated that the amount of loyalty points to be transferred must be less than or equal to the amount of loyalty points stored in the loyalty point account of the user.

The amount of loyalty points may be requested by, for example, one or more contributing members who have booking permissions. For example, the contributing member who initiated the request during step 510 of method 500 may request that each contributing member transfer a particular amount of loyalty points. The amount of loyalty points may be the same for each contributing member or may be different for each contributing member. The amount of loyalty points may be based on, for example, a particular booking request. For example, one of the contributing members who has booking permissions may find, via the API associated with the booking service, a particular flight that may cost 50,000 loyalty points. Within the loyalty point application, the contributing member who has booking permission may request that the total cost (or total amount of points required to book the flight) be divided up equally amongst the contributing members and the server computer system 120 may send a signal to the computing device of each contributing member requesting the amount of loyalty points.

As another example, the amount of loyalty points may not be for a particular booking. Put another way, the amount of loyalty points may be based on an amount set by a contributing member who has booking permissions.

The server computer system 120 transfers the amount of loyalty points from a data record associated with the loyalty point account of the at least one contributing member to a data record associated with the loyalty point account associated with the group (step 620).

Responsive to receiving the request to transfer the amount of loyalty points, the server computer system 120 transfers the amount of loyalty points from the data record associated with the loyalty point account of the contributing member to the data record associated with the loyalty point account associated with the group. In embodiments where the amount of loyalty points is not available in the data record associated with the loyalty point account of the contributing member, the server computer system 120 may generate an error and may send a signal to the computing device, the signal causing the computing device to display an error message to the contributing member.

The server computer system 120 receives, via the communications module and from the at least one computing device associated with the at least one contributing member, a signal including a booking request for one or more non-contributing members (step 630).

In this embodiment, the booking request is received from a computing device associated with a contributing member who has booking permissions. The booking request may include, for example, an amount of loyalty points to be applied to complete the booking request and information regarding the booking request. The booking request is for one or more non-contributing members. That is, the booking request is a request to complete a booking for a member of the group who is not required to contribute loyalty points to the loyalty point account associated with the group.

The server computer system 120 may perform a check to determine if the amount of loyalty points stored in the loyalty points account associated with the group is sufficient to complete the booking request and when it is not sufficient, the server computer system 120 may request the outstanding amount of loyalty points from the one or more contributing members. For example, the server computer system 120 may determine an amount of loyalty points required to offset the cost of the booking request for the one or more non-contributing members. The amount of loyalty points may be, for example, included with the booking request.

The server computer system 120 may determine that the amount of loyalty points required to offset the cost of the booking request for the one or more non-contributing members is greater than an amount of loyalty points stored in the loyalty point account associated with the group. Responsive to determining that the amount of loyalty points required to offset the cost of the booking request for the one or more non-contributing members is greater than the amount of loyalty points stored in the loyalty point account associated with the group, the server computer system 120 sends, via the communications module and the computing devices of the contributing members, a signal causing the computing devices to display a message indicating that the amount of loyalty points required to offset the cost of the booking for the one or more non-contributing members is greater than the amount of loyalty points stored in the loyalty point account associated with the group. The signal causing the computing devices to display a message indicating that the amount of loyalty points required to offset the cost of the booking for the one or more non-contributing members may only be sent to contributing members having booking permissions or to all contributing members. The message may include a selectable option to transfer an additional amount of loyalty points from the loyalty point account associated with the contributing member to the loyalty point account associated with the group. Loyalty points may be transferred in manners similar to that described herein.

The server computer system 120 applies loyalty points from the loyalty point account associated with the group to offset a cost of the booking request for the one or more non-contributing members and completes the booking request (step 640). In this embodiment, the server computer system 120 applies the loyalty points from the loyalty point account associated with the group to offset the cost of the booking request. For example, the loyalty points may be used to cover the cost of the booking request for the non-contributing member. The server computer system 120 deducts the loyalty points from the loyalty point account associated with the group and applies the loyalty points to complete the booking request. The booking request is thus completed.

Responsive to applying the loyalty points from the loyalty point account associated with the group to offset the cost of the booking request for one or more non-contributing members, the server computer system 120 may send, via the communications module and to a computing device associated with the non-contributing member, a signal indicating that the contributing members have contributed loyalty points to offset the cost of the booking request. For example, the one or more non-contributing members may receive an email indicating that the contributing members have completed a booking request for them. The email may include information relating to the booking request. The email may additionally include information related to the group and may include a selectable option that, when selected, causes the computing device to open the loyalty point application. In embodiments where the computing device of the non-contributing member does not have the loyalty point application, the email may include a selectable option that, when selected, downloads the loyalty point application. Once downloaded, the user may be prompted to authenticate and if the user does not have an account, the user may select a selectable option to create an account.

The non-contributing member may authenticate in manners similar to that described herein. Based on authentication information received from the computing device associated with the non-contributing member, the server computer system 120 may determine that the authentication information is associated with a non-contributing member. Responsive to determining that the authentication information is associated with the non-contributing member, the server computer system 120 may send, via the communications module and to the computing device associated with the non-contributing member, a signal causing the computing device to display a graphical user interface, such as the group hub graphical user interface, displaying limited information associated with the booking request. As such, within the loyalty point application the non-contributing member may only see limited information associated with the booking request. The limited information may include booking request details. For example, where the booking request is for a flight, the non-contributing member may see the flight information but may not see the cost (or amount of loyalty points used) to book the flight.

In some embodiments, the limited information provided to the non-contributing member may be defined by a contributing member having booking permissions. For example, the contributing member having booking permissions may wish to provide a flight date and time to the non-contributing member but may not wish to provide the flight destination to the non-contributing member. As such, the contributing members may withhold information regarding the booking request to surprise the non-contributing member.

In some embodiments, the limited information provided to the non-contributing member may be configured within the loyalty point application. For example, the contributing member having booking permissions may select one or more items displayed within the group hub graphical user interface to be withheld from the non-contributing member. For example, only the dates related to the booking request may be displayed to the non-contributing member. It will be appreciated that, within the loyalty point application, the contributing members will still see the full information relating to the booking request.

Figure 7:
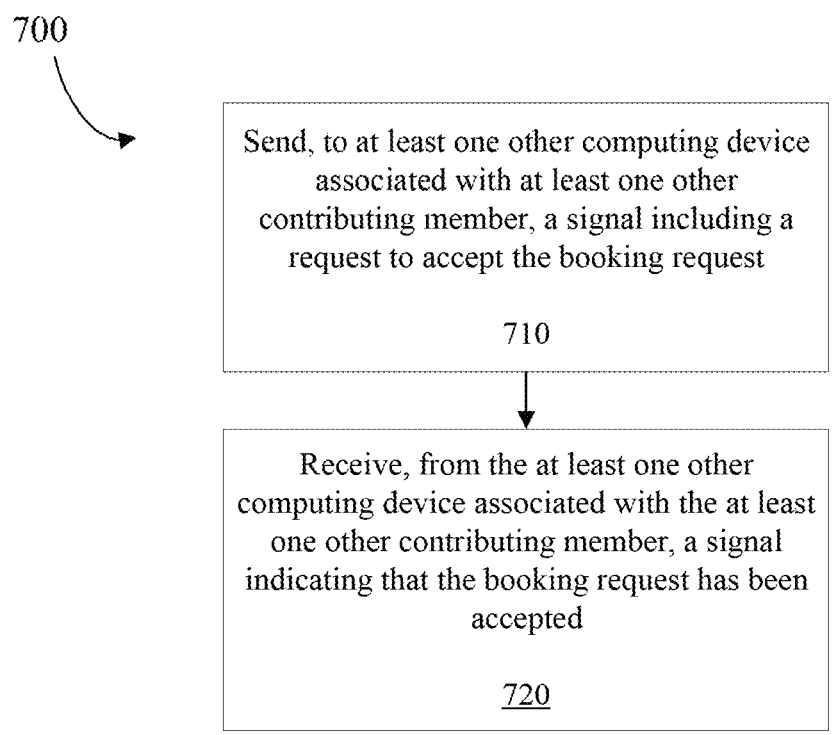
FIG. 7 is a flowchart showing operations performed by a server in obtaining consent from at least one other contributing member having booking permissions according to an embodiment.

As mentioned, in at least some embodiments, the contributing member submitting the booking request may require consent from at least one other contributing member. FIG. 7 is a flowchart showing operations performed by the server computer system 120 in obtaining consent from at least one other contributing member having booking permissions according to an embodiment. The operations may be included in a method 700 which may be performed by the server computer system 120. For example, computer-executable instructions stored in memory of the server computer system 120 may, when executed by one or more processors, configure the server computer system 120 to perform the method 700 or a portion thereof.

Responsive to receiving the signal including the booking request for the one or more non-contributing members during step 630 of method 600, the server computer system 120, sends, via the communications module and to at least one other computing device associated with at least one other contributing member, a signal including a request to accept the booking request (step 710). The at least one other contributing member may be a contributing member that has booking permissions. The request to accept the booking request may include a selectable option that, when selected, accepts the request and a selectable option that, when selected, rejects the request.

Figure 8:
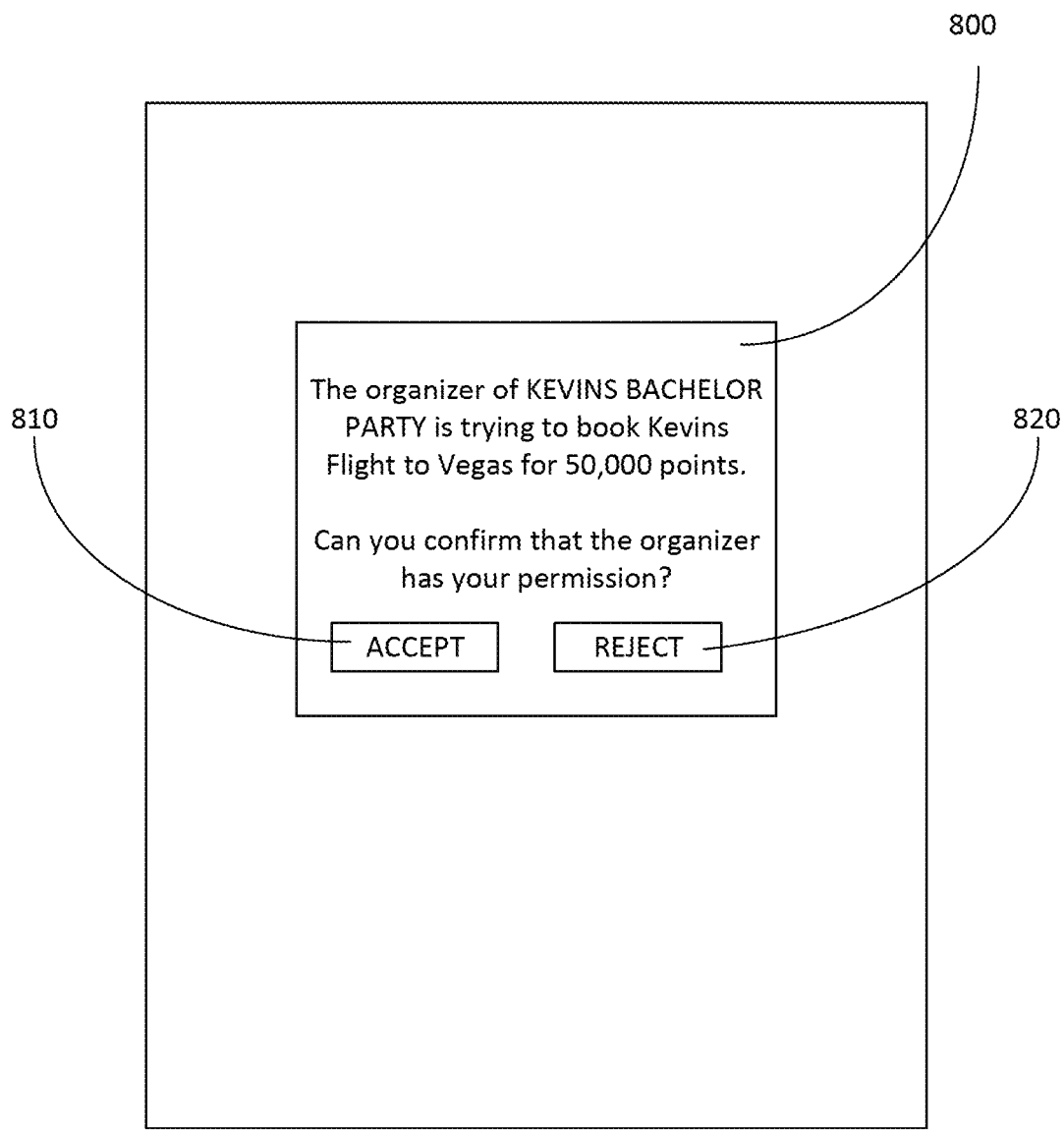
FIG. 8 is an example graphical user interface according to an embodiment.

An example graphical user interface 800 including the request to accept the booking request is shown in FIG. 8. As can be seen, the graphical user interface 800 includes information regarding the booking request and includes a first selectable option 810 that, when selected, accepts the request and a second selectable option 820 that, when selected, rejects the request.

The server computer system 120 receives, via the communications module and from the at least one other computing device associated with the at least one other contributing member, a signal indicating that the booking request has been accepted (step 720). Responsive to the at least one other contributing member selecting the selectable option to accept the request, the computing device associated with the at least one other contributing members sends a signal indicating that the booking request has been accepted to the server computer system 120.

Responsive to receiving the signal indicating that the booking request has been accepted, the server computer system 120 applies the loyalty points from the loyalty point account associated with the group to offset the cost of the booking request for the one or more non-contributing member and this may be done in manners similar to step 640 of method 600.

It will be appreciated that, where the at least one other contributing member has selected the selectable option to reject the request, the server computer system 120 may cancel the request and may send a notification to the computing device of the contributing member who initiated the request indicating that the request was rejected. The booking request is then cancelled.

In this manner, a contributing member that has booking permissions may not complete a booking request without the consent of at least one other contributing member.

Figure 9:
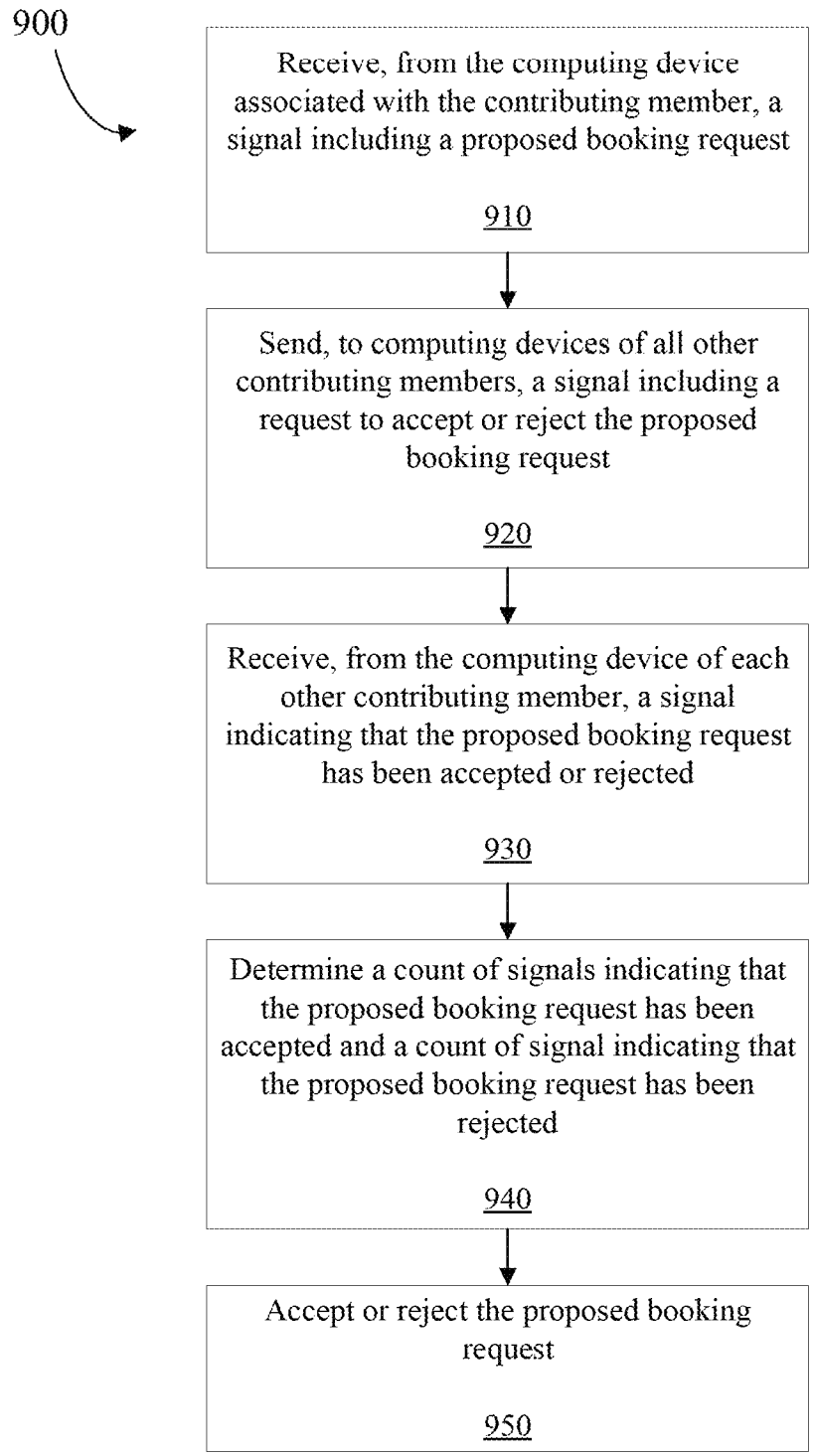
FIG. 9 is a flowchart showing operations performed by a server in accepting or rejecting a proposed booking request according to an embodiment.

In at least some embodiments, all contributing members may vote on a proposed booking request. FIG. 9 is a flowchart showing operations performed by the server computer system 120 in obtaining consent from at least one other contributing member having booking permissions according to an embodiment. The operations may be included in a method 900 which may be performed by the server computer system 120. For example, computer-executable instructions stored in memory of the server computer system 120 may, when executed by one or more processors, configure the server computer system 120 to perform the method 900 or a portion thereof.

The server computer system 120 receives, via the communications module and from the computing device associated with the contributing member, a signal including a proposed booking request (step 910). The proposed booking request may be received in a manner similar to that described above with reference to step 630 of method 600.

The server computer system 120 sends, via the communications module and to computing devices of all other contributing members, a signal including a request to accept or reject the proposed booking request (step 920). The request to accept the booking request may include a selectable option that, when selected, accepts the request and a selectable option that, when selected, rejects the request.

Figure 10:
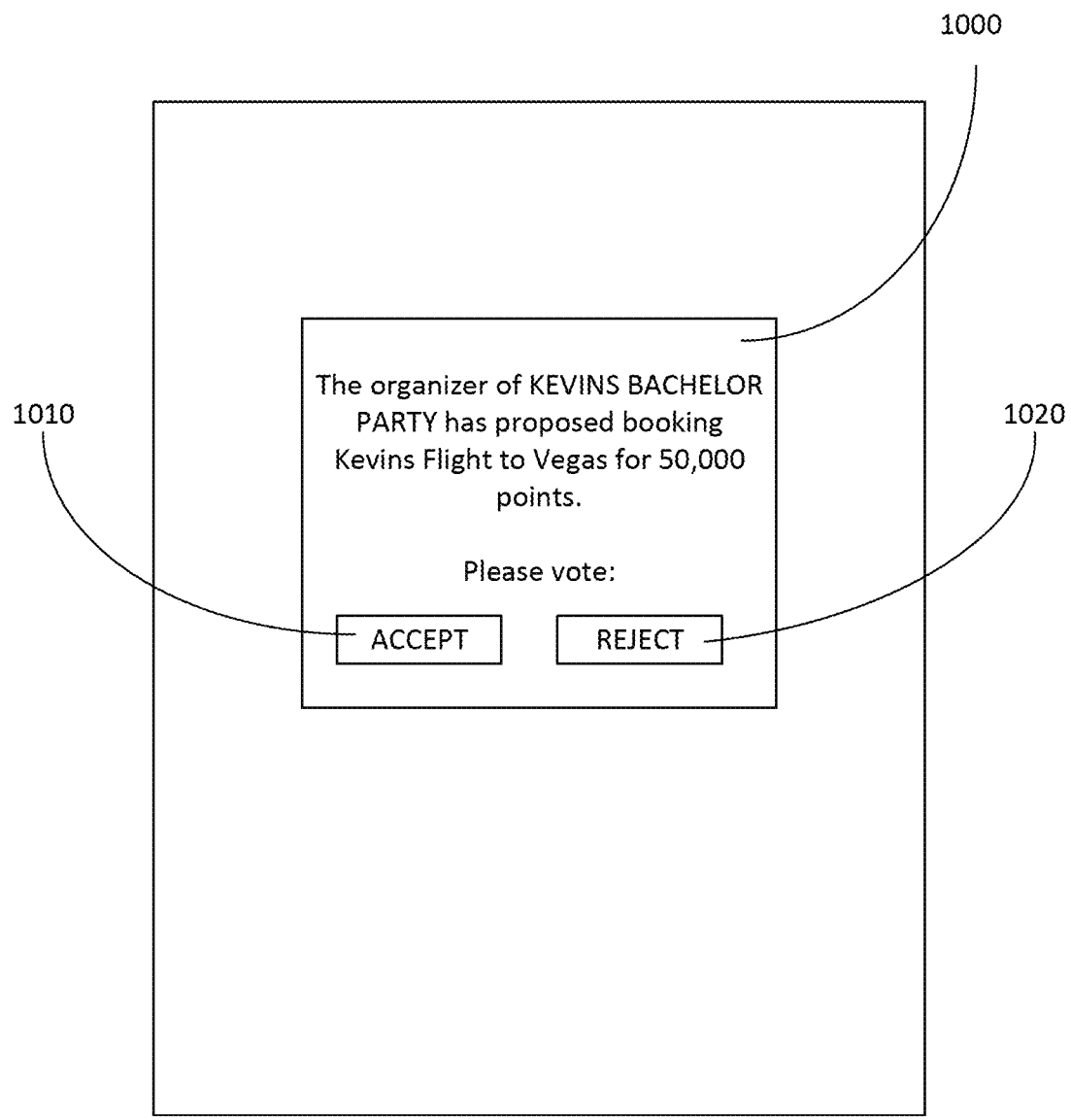
FIG. 10 is another example graphical user interface according to an embodiment.

An example graphical user interface 1000 including the request to accept the booking request is shown in FIG. 10. As can be seen, the graphical user interface 1000 includes information regarding the booking request and includes a first selectable option 1010 that, when selected, accepts the request and a second selectable option 1020 that, when selected, rejects the request.

The server computer system 120 receives, via the communications module and from each computing device associated with each contributing member, a signal indicating that the proposed booking request has been accepted or rejected (step 930).

The server computer system 120 determines a count of signals indicating that the proposed booking request has been accepted and a count of signals indicating that the proposed booking request has been rejected (step 940). In this embodiment, the server computer system 120 may wait until all contributing members have accepted or rejected the request before determining the counts.

The server computer system 120 accepts or rejects the proposed booking request (step 950). For example, the server computer system 120 may determine that the count of signals indicating that the proposed booking request has been rejected is greater than the count of signals indicating that the proposed booking request has been accepted. Responsive to determining that the count of signals indicating that the proposed booking request has been rejected is greater than the count of signals indicating that the proposed booking request has been accepted, the server computer system 120 rejects the proposed booking request and sends, via the communications module and to the at least one computing device associated with the contributing member, a signal including a notification that the proposed booking request has been rejected.

Responsive to determining that the count of signals indicating that the proposed booking request has been accepted is greater than the count of signals indicating that the proposed booking request has been rejected, the server computer system 120 accepts the booking request and completes the booking request in manners similar to that described herein.

In this manner, all contributing members are able to vote on a proposed booking request prior to the proposed booking request being completed.

Figure 11:
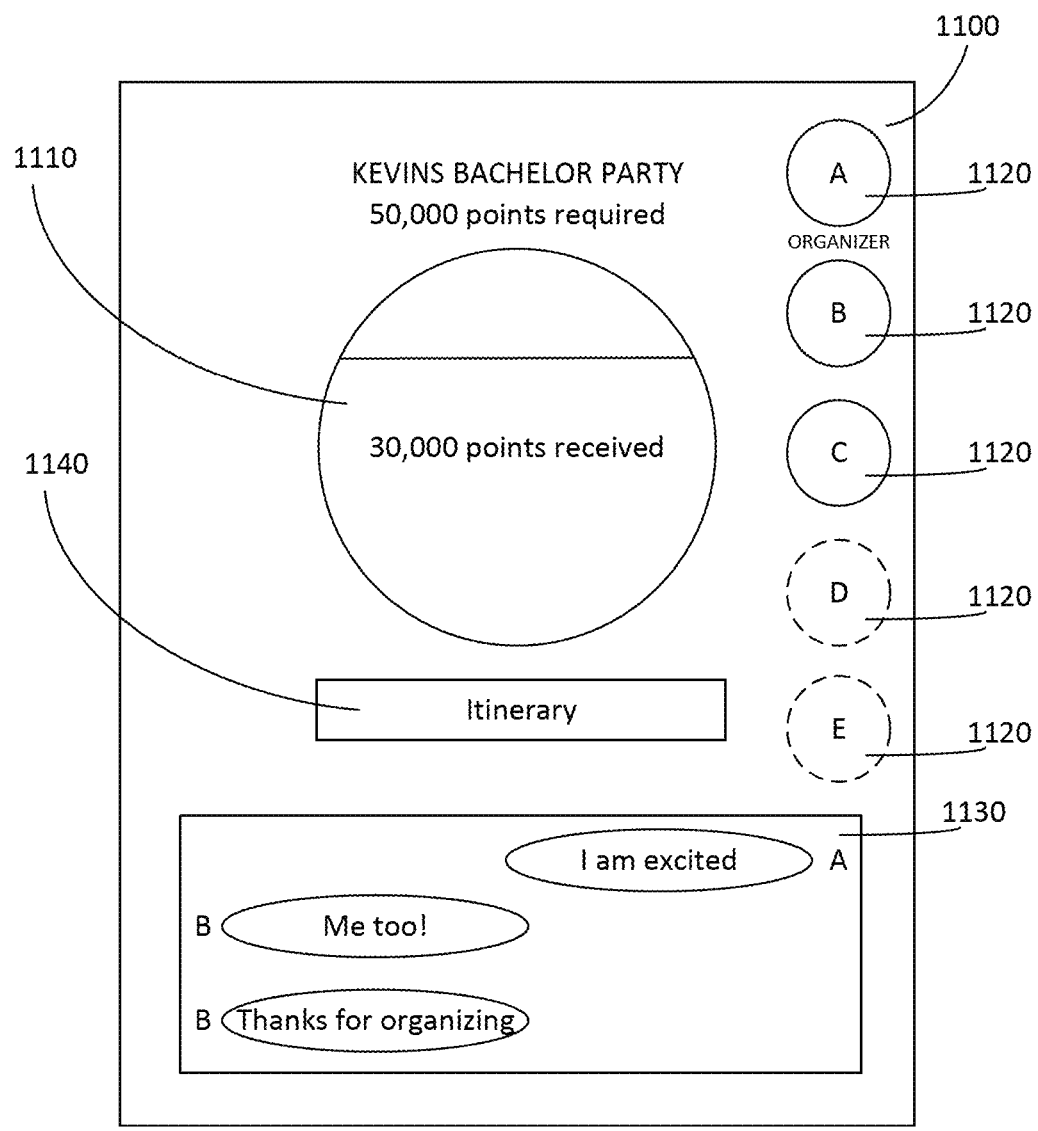
FIG. 11 is an example group hub graphical user interface according to an embodiment.

As mentioned, the server computer system 120 may provide a group hub graphical user interface that may be accessed by the contributing members within the loyalty point application. An example group hub graphical user interface 1100 is shown in FIG. 11.

As can be seen, the group hub graphical user interface 1100 includes an icon 1110 displaying information related to the loyalty point account associated with the group. In the example shown, 30,000 loyalty points have been received from the contributing members and the total amount of loyalty points required is 50,000.

The group hub graphical user interface includes icons 1120 associated with each member of the group. In the example shown in FIG. 11, the icons 1120 are associated with each contributing member of the group, namely A, B, C, D, and E. The contributing member A is the contributing member who has booking permissions and as such information identifying contributing member A as the "Organizer" is displayed below the associated icon 1120. The icons 1120 for each contributing member may include a graphic or other display feature indicating whether or not that contributing member has transferred points into the loyalty point account associated with the group. In the example shown in FIG. 11, contributing members A, B and C have transferred loyalty points into the loyalty point account associated with the group and as such the icons 1120 corresponding to contributing members A, B and C are displayed with solid lines. Contributing members D and E have not yet transferred loyalty points into the loyalty point account associated with the group and as such the icons 1120 corresponding to contributing members D and E are displayed with dotted lines. It will be appreciated that other display features may be used and may include, for example, colours, animations, symbols, etc.

The group hub graphical user interface includes chat module 1130 which, as described above, allows the contributing members to exchange messages within the loyalty point application. Each contributing member may send a message to the other contributing members within the chat module 1130. For example, a contributing member may perform a tap gesture on a display screen of their computing device at a location corresponding to the chat module 1130. Responsive to the tap gesture, the computing device may display keyboard that may be used by the contributing member to enter and submit a message. Once submitted, the chat module 1130 may be updated to display the message along with an identifier identifying the name of the contributing member who sent the message.

The group hub graphical user interface includes a selectable option 1140 that, when selected, causes the computing device of the contributing member to display information relating to the booking request. Where a booking request has not yet been submitted, selection of the selectable option 1140 may cause the computing device to display proposed booking requests as submitted by the contributing members. In another embodiment, selection of the selectable option 1140 may cause the computing device to display a window associated with one or more APIs that may, for example, be used to submit a booking request. In some embodiments, only contributing members who have booking permissions may select the selectable option 1140 within the group hub graphical user interface to submit a booking request. In some embodiments, the selectable option 1140 may be associated with the API that may be used to submit the booking request for the contributing members that have booking permissions and the selectable option 1140 may be associated with displaying an itinerary for the contributing members who do not have booking permissions.

It will be appreciated that in at least some embodiments, the group hub graphical user interface 1100 may display one or more objects associated with one or more APIs that may be used to submit a booking request. For example, the group hub graphical user interface 1100 may display an object associated with a flight booking service and/or a hotel booking service.

Figure 12:
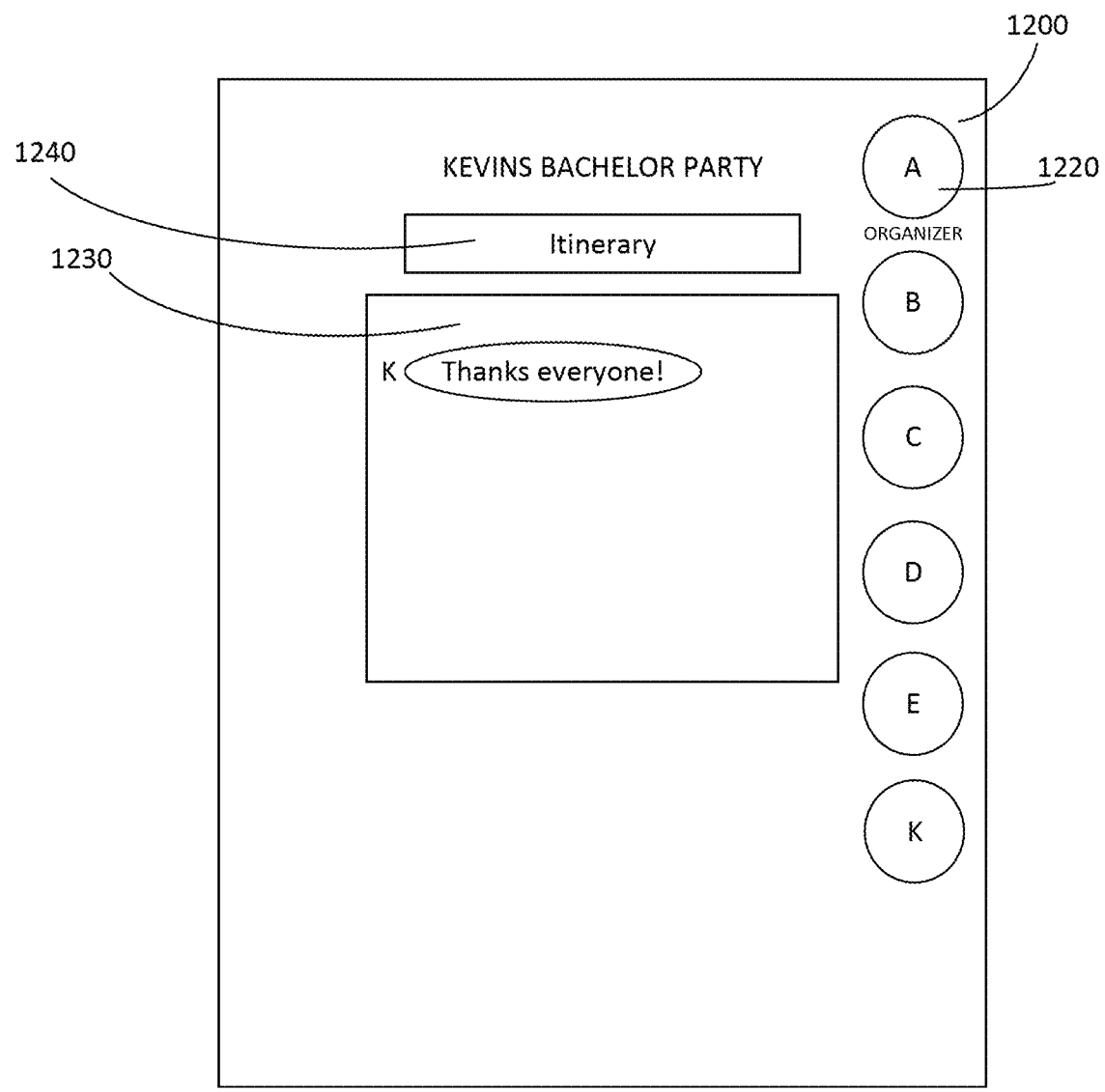
FIG. 12 is another example group hub graphical user interface according to an embodiment.

As mentioned previously, the group hub graphical user interface may display partial information related to the booking request for the non-contributing members. An example group hub graphical user interface 1200 is shown in FIG. 12. As can be see, the group hub graphical user interface 1200 is similar to the group hub graphical user interface 1100 with the following exceptions. In the group hub graphical user interface 1200, information related to the cost (or amount of points) required to complete the booking request is not shown. Put another way, the non-contributing members cannot see information relating to the cost (or amount of points) of the booking request. The group hub graphical user interface 1200 does, however, include the icons 1220 associated with each member of the group, the chat module 1230 and the selectable option 1240. The icons 1220 may be similar to icons 1120 with the exception that the icons 1220 may not include different features for contributing members who have not yet transferred loyalty points into the loyalty point account associated with the group. The chat module 1230 may be similar to chat module 1130 with the exception that messages exchanged prior to the non-contributing members accessing the group hub graphical user interface may not be visible and this may be such that the non-contributing members do not see messages that were exchanged by the contributing members when planning the booking request. The selectable option 1240, when selected, may cause the computing device associated with the one or more non-contributing members to display information relating to the booking request with the exception that the information does not include the cost (or amount of points) used to complete the booking request.

The methods described above may be modified and/or operations of such methods combined to provide other methods.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A server computer system comprising:
   a communications module;
   a processor coupled with the communications module; and
   a memory coupled to the processor and storing processor-executable instructions which, when executed by the processor, configure the processor to:
      receive, via the communications module and from a computing device associated with a contributing member, a signal defining one or more interface elements to be displayed on a computing device associated with a non-contributing member and one or more interface elements to be withheld from being displayed on the computing device associated with the non-contributing member;
      receive, via the communications module and from the computing device associated with the contributing member, a signal including a booking request for the non-contributing member;
      complete the booking request by applying loyalty points from a loyalty point account associated with a group of contributing members to offset a cost of the booking request for the non-contributing member;
      responsive to completing the booking request, send, via the communications module and to the computing device associated with the non-contributing member, a signal indicating that the group of contributing members have contributed loyalty points to offset the cost of the booking request for the non-contributing member and including a selectable option that, when selected, causes the computing device associated with the non-contributing member to display a user interface that includes the one or more interface elements to be displayed and does not include the one or more interface elements to be withheld from being displayed;
      receive, via the communications module and from the computing device associated with the non-contributing member, a signal indicating selection of the selectable option; and
      responsive to receiving the signal indicating selection of the selectable option, send, via the communications module and to the computing device associated with the non-contributing member, a signal causing the computing device associated with the non-contributing member to display the user interface that includes the one or more interface elements to be displayed and does not include the one or more interface elements to be withheld from being displayed.

2. The server computer system of claim 1, wherein the processor-executable instructions, when executed by the processor, further configure the processor to:
   send, via the communications module and to the computing device associated with the non-contributing member, a signal causing the computing device associated with the non-contributing member to open a particular mobile application to display the user interface.

3. The server computer system of claim 1, wherein responsive to receiving the signal indicating selection of the selectable option, the processor-executable instructions, when executed by the processor, further configure the processor to:
   determine that the computing device associated with the non-contributing member does not have a particular mobile application; and
   send, via the communications module and to the computing device associated with the non-contributing member, a signal causing the at least one computing device to download the particular mobile application.

4. The server computer system of claim 1, wherein the one or more interface elements to be withheld from being displayed include a cost or amount of loyalty points applied to complete the booking request.

5. The server computer system of claim 1, wherein the contributing member that defines the one or more interface elements to be displayed on the computing device associated with the non-contributing member and the one or more interface elements to be withheld from being displayed on the computing device associated with the non-contributing member has booking permissions for completing the booking request.

6. The server computer system of claim 1, wherein the processor-executable instructions, when executed by the processor, further configure the processor to:
receive, via the communications module and from the computing device associated with the non-contributing member, a signal including authentication information;
determine that the authentication information is associated with the non-contributing member; and
responsive to determining that the authentication information is associated with the non-contributing member, send, via the communications module and to the computing device associated with the non-contributing member, a signal causing the computing device associated with the non-contributing member to display the user interface that includes the one or more interface elements to be displayed and does not include the one or more interface elements to be withheld from being displayed.

7. The server computer system of claim 1, wherein the processor- executable instructions, when executed by the processor, further configure the processor to:
responsive to receiving the signal that includes the booking request, send, via the communications module and to at least one other computing device associated with at least one other contributing member, a signal including a request to accept the booking request;
receive, via the communications module and from the at least one other computing device associated with the at least one other contributing member, a signal indicating that the booking request has been accepted; and
responsive to receiving the signal indicating that the booking request has been accepted, apply the loyalty points from the loyalty point account associated with the group of contributing members to offset the cost of the booking request for the non-contributing member.

8. The server computer system of claim 1, wherein the processor-executable instructions, when executed by the processor, further configure the processor to:
receive, via the communications module and from the computing device associated with the contributing member, a signal including a proposed booking request;
send, via the communications module and to computing devices of all other contributing members, a signal including a request to accept or reject the proposed booking request;
receive, via the communications module and from each computing device associated with each contributing member, a signal indicating that the proposed booking request has been accepted or rejected;
determine a count of signals indicating that the proposed booking request has been accepted and a count of signals indicating that the proposed booking request has been rejected;
determine that the count of signals indicating that the proposed booking request has been rejected is greater than the count of signals indicating that the proposed booking request has been accepted; and
responsive to determining that the count of signals indicating that the proposed booking request has been rejected is greater than the count of signals indicating that the proposed booking request has been accepted, reject the proposed booking request and send, via the communications module and to the computing device associated with the contributing member, a signal including a notification that the proposed booking request has been rejected.

9. The server computer system of claim 1, wherein the loyalty point account associated with the group of contributing members includes loyalty points received from a loyalty point account associated with the contributing member.

10. A computer-implemented method performed by a processor of a computer server system, the method comprising:
receiving, via a communications module and from a computing device associated with a contributing member, a signal defining one or more interface elements to be displayed on a computing device associated with a non-contributing member and one or more interface elements to be withheld from being displayed on the computing device associated with the non-contributing member;
receiving, via the communications module and from the computing device associated with the contributing member, a signal including a booking request for the non-contributing member;
completing the booking request by applying loyalty points from a loyalty point account associated with a group of contributing members to offset a cost of the booking request for the non-contributing member;
responsive to completing the booking request, sending, via the communications module and to the computing device associated with the non-contributing member, a signal indicating that the group of contributing members have contributed loyalty points to offset the cost of the booking request for the non-contributing member and including a selectable option that, when selected, causes the computing device associated with the non-contributing member to display a user interface that includes the one or more interface elements to be displayed and does not include the one or more interface elements to be withheld from being displayed;
receiving, via the communications module and from the computing device associated with the non-contributing member, a signal indicating selection of the selectable option; and
responsive to receiving the signal indicating selection of the selectable option, sending, via the communications module and to the computing device associated with the non-contributing member, a signal causing the computing device associated with the non-contributing member to display the user interface that includes the one or more interface elements to be displayed and does not include the one or more interface elements to be withheld from being displayed.

11. The computer-implemented method of claim 10, further comprising:
sending, via the communications module and to the computing device associated with the non-contributing member, a signal causing the computing device associated with the non-contributing member to open a particular mobile application to display the user interface.

12. The computer-implemented method of claim 10, wherein, responsive to receiving the signal indicating selection of the selectable option, the method further comprises:
determining that the computing device associated with the non-contributing member does not have a particular mobile application; and sending, via the communications module and to the computing device associated with the non-contributing member, a signal causing the at least one computing device to download the particular mobile application.

13. The computer-implemented method of claim 10, wherein the contributing member that defines the one or more interface elements to be displayed on the computing device associated with the non-contributing member and the one or more interface elements to be withheld from being displayed on the computing device associated with the non-contributing member has booking permissions for completing the booking request.

14. The computer-implemented method of claim 10, further comprising:
   receiving, via the communications module and from the computing device associated with the non-contributing member, a signal including authentication information;
   determining that the authentication information is associated with the non-contributing member; and
   responsive to determining that the authentication information is associated with the non-contributing member, sending, via the communications module and to the computing device associated with the non-contributing member, a signal causing the computing device associated with the non-contributing member to display the user interface that includes the one or more interface elements to be displayed and does not include the one or more interface elements to be withheld from being displayed.

15. The computer-implemented method of claim 10, wherein the loyalty point account associated with the group of contributing members includes loyalty points received from a loyalty point account associated with the contributing member.

16. A non-transitory computer readable storage medium comprising computer-executable instructions which, when executed, configure a processor to:
   receive, via a communications module and from a computing device associated with a contributing member, a signal defining one or more interface elements to be displayed on a computing device associated with a non-contributing member and one or more interface elements to be withheld from being displayed on the computing device associated with the non-contributing member;
   receive, via the communications module and from the computing device associated with the contributing member, a signal including a booking request for the non-contributing member;
   complete the booking request by applying loyalty points from a loyalty point account associated with a group of contributing members to offset a cost of the booking request for the non-contributing member;
   responsive to completing the booking request, send, via the communications module and to the computing device associated with the non-contributing member, a signal indicating that the group of contributing members have contributed loyalty points to offset the cost of the booking request for the non-contributing member and including a selectable option that, when selected, causes the computing device associated with the non-contributing member to display a user interface that includes the one or more interface elements to be displayed and does not include the one or more interface elements to be withheld from being displayed;
   receive, via the communications module and from the computing device associated with the non-contributing member, a signal indicating selection of the selectable option; and
   responsive to receiving the signal indicating selection of the selectable option, send, via the communications module and to the computing device associated with the non-contributing member, a signal causing the computing device associated with the non-contributing member to display the user interface that includes the one or more interface elements to be displayed and does not include the one or more interface elements to be withheld from being displayed.

* * * * *